United States Patent
Scheim et al.

(10) Patent No.: US 10,745,523 B2
(45) Date of Patent: Aug. 18, 2020

(54) CROSS-LINKABLE MASSES BASED ON ORGANOSILICON COMPOUNDS

(71) Applicant: Wacker Chemie AG, Munich (DE)

(72) Inventors: Uwe Scheim, Coswig (DE); Hartmut Ackermann, Burghausen (DE); Volker Stanjek, Ampfing (DE)

(73) Assignee: WACKER CHEMIE AG, Munich (DE)

( * ) Notice: Subject to any disclaimer, the term of this patent is extended or adjusted under 35 U.S.C. 154(b) by 84 days.

(21) Appl. No.: 16/306,458

(22) PCT Filed: Mar. 6, 2017

(86) PCT No.: PCT/EP2017/055210
§ 371 (c)(1),
(2) Date: Nov. 30, 2018

(87) PCT Pub. No.: WO2018/162033
PCT Pub. Date: Sep. 13, 2018

(65) Prior Publication Data
US 2019/0153166 A1    May 23, 2019

(51) Int. Cl.
| | |
|---|---|
| *C08L 83/08* | (2006.01) |
| *C08G 77/388* | (2006.01) |
| *C09D 183/08* | (2006.01) |
| *C08G 77/18* | (2006.01) |
| *C08G 77/26* | (2006.01) |
| *C08K 5/17* | (2006.01) |

(52) U.S. Cl.
CPC .......... *C08G 77/388* (2013.01); *C08G 77/18* (2013.01); *C08G 77/26* (2013.01); *C08K 5/17* (2013.01); *C08L 83/08* (2013.01); *C09D 183/08* (2013.01); *C08L 2312/08* (2013.01)

(58) Field of Classification Search
CPC ........ C08L 183/08; C08G 77/18; C08G 77/26
USPC ...................... 528/38; 106/287.11
See application file for complete search history.

(56) References Cited

U.S. PATENT DOCUMENTS

| | | | |
|---|---|---|---|
| 5,418,006 A | 5/1995 | Roth et al. | |
| 7,151,150 B2 * | 12/2006 | Scheim | C08G 77/26 528/38 |
| 8,207,260 B2 * | 6/2012 | Schoeley | C08L 83/08 524/588 |
| 10,526,354 B2 * | 1/2020 | Wang | C09J 11/06 |
| 2009/0234071 A1 | 9/2009 | Martz et al. | |
| 2009/0293768 A1 | 12/2009 | Atsuchi et al. | |
| 2015/0368508 A1 * | 12/2015 | Bodkhe | B05D 3/007 428/447 |

FOREIGN PATENT DOCUMENTS

| | | |
|---|---|---|
| EP | 0552773 A1 | 7/1993 |
| WO | 9838257 A1 | 9/1998 |

OTHER PUBLICATIONS

"Lehrbuch der Bauphysik", von Lutz, Jenisch, Klopfer, Freymuth, Krampf and Petzold, Verlag B.G. Teubner, 4. Auflage von 1997, Seite 354, and English Abstract.

* cited by examiner

*Primary Examiner* — Margaret G Moore
(74) *Attorney, Agent, or Firm* — Brooks Kushman P.C.

(57) ABSTRACT

The invention relates to cross-linkable compositions comprising
(A) organosiloxanes consisting of units $$R_c SiO_{4-c/2} \qquad (I)$$

and $$R^5(OR^4)_m SiO_{3-m/2} \qquad (II),$$

(B) silanes $$R^5 Si(OR^4)_3 \qquad (II)$$

and/or partial hydrolysates thereof
in amounts of 5 to 20 parts by weight, based on 100 parts by weight of component (A),
(C) organosiloxanes consisting of units $$R^6_a(R^7O)_b SiO_{(4-a-b)/2} \qquad (IV)$$

in amounts of 1 to 30 parts by weight,
(D) organosilicon compounds comprising units of the formula $$D_f Si(OR^9)_e R^8_d O_{(4-d-e-f)/2} \qquad (V),$$

in amounts of 0.1 to 2 parts by weight. The compositions are particularly useful as anti-graffiti coating.

12 Claims, No Drawings

CROSS-LINKABLE MASSES BASED ON ORGANOSILICON COMPOUNDS

CROSS REFERENCE TO RELATED APPLICATIONS

This application is the U.S. National Phase of PCT Appln. No. PCT/EP2017/055210 filed Mar. 6, 2017, the disclosure of which is incorporated in its entirety by reference herein.

BACKGROUND OF THE INVENTION

1. Field of the Invention

The invention relates to cross-linkable compositions based on organosilicon compounds, and to processes for the production and use thereof, especially for coating and treating surfaces against soiling.

2. Description of the Related Art

One-component systems (RTV-1) that are storage-stable in the absence of water, vulcanizing to give elastomers in the presence of water at room temperature, have long been known. These products are used in large amounts, for example in the construction industry, inter alia as coatings. The basis of these mixtures are polymers which are terminated by silyl groups which bear reactive groups such as alkoxy groups, for example. In addition, these systems may comprise fillers, plasticizers, cross-linkers, catalysts and additives. However, the products are generally not free-flowing. It is possible to achieve flow capability by adding large amounts of cross-linker and solvent. A disadvantage of such systems, however, is that high shrinkage may occur during curing, especially if relatively large amounts of cross-linker are used. The large amounts of cross-linker, optionally even in combination with solvent, can result in crack formation during curing or even in deformation of the surface ("orange peel").

Surface contaminants, such as graffiti and unauthorized bill posting, cause extensive damage year after year. Walls, masonry and rail vehicles especially are affected by graffiti, but also smaller items such as distribution boxes and traffic signs. Methods for removing such surface contaminants are already known. Reference can be made here, for example, to EP-A 552 773 and WO 98/38257. Most existing anti-graffiti systems form a continuous film on the subsurface to be protected, which seals all pores of the subsurface and acts as a separation layer between the substrate and the sprayed-on paint. This separation layer ensures that the sprayed-on paint does not penetrate into the pores of the subsurface and therefore adheres poorly to the subsurface and can therefore be easily removed again. Typically, the graffiti can be washed off in a cleaning process using a suitable cleaning agent.

With respect to the durability of the graffiti prophylaxis, a distinction is drawn between temporary, semi-permanent and permanent systems. The criterion here is how the separation layer behaves when the graffiti is washed off. If it remains completely intact and it withstands at least 15 spray attacks plus subsequent cleaning processes, the system counts as permanent. If, in contrast, the protective layer is washed off together with the graffiti, it is called a temporary system or a sacrificial layer. In terms of durability, semi-permanent systems are between the two extremes.

The protective film of temporary systems usually consists of waxes, biopolymers or acrylates. These materials do not impede the transport of water vapor from the subsurface to the surrounding air and are invisible, which is why they can even be used on listed buildings. Their disadvantage is that the protective film has to be completely replaced after cleaning off the graffiti and, even in the absence of graffiti attacks, only lasts a few years.

In the case of semi-permanent coatings, generally the whole separation layer is not lost, but rather only a layer component, during the cleaning. After each graffiti removal and every three to five years, the subsurface has to be retreated. The advantage is that semi-permanent coatings are barely perceptible to the eye and that they are permeable to water vapor. Mixtures of organic waxes, silanes and siloxanes are often used. However, these coatings ultimately have the same disadvantage as the temporary systems, even if the time intervals between two recoatings are somewhat longer. Particularly for the protection of surfaces regularly affected by graffiti, they are unsuitable or of limited suitability.

The major advantage of permanent anti-graffiti systems is that they remain intact after cleaning off the graffiti and last for many years without losing their protective effect. The disadvantage is that they usually alter the appearance of the subsurface. In addition, the layers in many conventional permanent systems are so thick that water vapor cannot pass through. If such a diffusion-inhibiting coating is present on a moist subsurface, the moisture cannot escape. Consequently, this can result in a partial detachment of the protective film. Moisture damage to the building structure is also possible.

SUMMARY OF THE INVENTION

Surprisingly, it has been found that the compositions described below are outstandingly suitable for producing permanent anti-graffiti coatings. The coatings adhere surprisingly well to the subsurface even without pre-treatment with primer, whereas the graffiti adhere poorly to the coating and can therefore be easily removed without the coating itself being damaged. The compositions comprise a mixture of alkoxy-functional organopolysiloxanes also containing a secondary or tertiary, SiC bonded aminomethylene group, an alkoxysilane bearing an SiC bonded aminomethylene group, an alkoxy group-containing organosiloxane, and an organosilicon compound having at least one nitrogen atom not bonded to a carbonyl group.

The invention thus provides cross-linkable compositions comprising (A) organosiloxanes consisting of units of the formulae

$$R_c SiO_{4-c/2} \tag{I}$$

and

$$R^5(OR^4)_m SiO_{3-m/2} \tag{II},$$

where
R denotes identical or different monovalent, optionally substituted hydrocarbon radicals,
$R^4$ may be identical or different and are monovalent, optionally substituted hydrocarbon radicals,
$R^5$ denotes a group —$CH_2$—$NR^2R^3$,
$R^2$ denotes a hydrogen atom or a monovalent, optionally substituted linear or branched hydrocarbon radical having 1 to 6 carbon atoms,
$R^3$ denotes a monovalent, optionally substituted linear or branched hydrocarbon radical having 1 to 6 carbon atoms or a cyclic saturated hydrocarbon radical having 5 or 6 carbon atoms or a phenyl radical, c is 1 or 2, preferably 2, and
m is 0, 1 or 2, preferably 2,
with the proviso that at least two $R^5$ radicals and at least four $(OR^4)$ groups are present per molecule,
(B) silanes of the formula

$$R^5Si(OR^4)_3 \qquad (III)$$

and/or partial hydrolysates thereof
in amounts of 5 to 20 parts by weight, based on 100 parts by weight of component (A),
(C) organosiloxanes consisting of units of the formula

$$R^6{}_a(R^7O)_bSiO_{(4-a-b)/2} \qquad (IV),$$

where
$R^6$ may be the same or different and are monovalent, SiC-bonded hydrocarbon radicals optionally substituted by a halogen atom, or an Si-bonded halogen atom,
$R^7$ may be the same or different and denotes a monovalent, optionally substituted hydrocarbon radical,
a is 0 or 1 and
b is 0, 1, 2 or 3,
with the proviso that, in formula (IV), the sum of a+b is <4, the organosiloxane has 2 to 30 units of the formula (IV) and at least one unit is present per molecule where b is other than 0, in amounts of 1 to 30 parts by weight, based on 100 parts by weight of component (A),
(D) organosilicon compounds comprising units of the formula

$$D_fSi(OR^9)_eR^8{}_dO_{(4-d-e-f)/2} \qquad (V),$$

where
$R^9$ may be the same or different and denotes a monovalent, optionally substituted SiC-bonded organic radical free of nitrogen,
$R^9$ may be the same or different and denotes a hydrogen atom or optionally substituted hydrocarbon radicals,
D may be the same or different and denotes a monovalent, SiC-bonded radical having at least one nitrogen atom that is not bonded to a carbonyl group (C=O),
d is 0 or 1, preferably 0,
e is 0, 1, 2 or 3, preferably 1, 2 or 3, particularly preferably 3, and
f is 0 or 1, preferably 1,
with the proviso that the sum of d+e+f is less than or equal to 4, at least one radical D is present per molecule and at least one radical D bears an $NH_2$ group per molecule,
in amounts of 0.1 to 2 parts by weight, based on 100 parts by weight of component (A).

Examples of radicals R and $R^6$ are each independently alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, and the α- and the β-phenylethyl radicals.

Examples of substituted radicals R and $R^6$ are each independently haloalkyl radicals such as the 3,3,3-trifluoroprop-1-yl radical, the 1,1,1,3,3,3-hexafluoroprop-2-yl radical and the heptafluoroprop-2-yl radical.

The radicals R are preferably monovalent hydrocarbon radicals having 1 to 18 carbon atoms, optionally substituted by halogen atoms, more preferably alkyl radicals, and especially the methyl radical.

The radical $R^6$ are preferably unsubstituted linear or branched alkyl groups having 1 to 8 carbon atoms, more preferably the methyl, ethyl, vinyl, n-octyl or 2,4,4-trimethylpentyl radicals.

Examples of the radical $R^8$ are the radicals specified for R. The radicals $R^8$ are preferably monovalent hydrocarbon radicals having 1 to 18 carbon atoms, more preferably alkyl radicals, and especially the methyl radical.

Examples of radicals $R^4$, $R^7$ and $R^9$ are each independently the radicals specified for R. The radicals $R^4$ and $R^7$ are preferably, each independently, alkyl radicals having 1 to 6 carbon atoms, more preferably methyl or ethyl radicals.

The radicals $R^9$ are preferably hydrogen or alkyl radicals having 1 to 6 carbon atoms, more preferably methyl or ethyl radicals.

Examples of hydrocarbon radicals $R^2$ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals and hexyl radicals such as the n-hexyl radical.

The radicals $R^2$ are preferably hydrogen, or methyl, ethyl, n-propyl or 1-n-butyl radicals, more preferably ethyl or 1-n-butyl radicals, and especially the n-butyl radical.

Examples of $R^3$ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; cycloalkyl radicals such as the cyclopentyl and cyclohexyl radicals; and also the phenyl radical.

The radical $R^3$ is preferably a methyl, ethyl, n-propyl, 1-n-butyl or cyclohexyl radical, more preferably an ethyl, n-butyl or cyclohexyl radical, especially the n-butyl radical.

The radicals $R^2$ and $R^3$ preferably have the same definition.

Examples of $R^5$ are the N,N-dimethylaminomethyl, N,N-diethylaminomethyl, N,N-di-n-propylaminomethyl, N,N-di-n-butylaminomethyl, N-methyl-N-ethylaminomethyl, N-methyl-N-n-propylaminomethyl, N-methyl-N-n-butylaminomethyl, N-ethyl-N-n-propylaminomethyl, N-ethyl-N-n-butylaminomethyl, N-n-propyl-N-n-butylaminomethyl, N-methylaminomethyl, N-ethylaminomethyl, N-n-propylaminomethyl, N-prop-2-ylaminomethyl, N-n-butylaminomethyl, N-but-2-ylaminomethyl, N-cyclopentylaminomethyl and N-cyclohexylaminomethyl radicals.

The radical $R^5$ is preferably an N,N-dimethylaminomethyl, N,N-diethylaminomethyl, N,N-di-n-propylaminomethyl, N,N-di-n-butylaminomethyl, N-n-butylaminomethyl, N-but-2-ylaminomethyl, N-cyclopentylaminomethyl or N-cyclohexylaminomethyl radical, more preferably an N,N-dimethylaminomethyl, N,N-diethylaminomethyl, N,N-di-n-propylaminomethyl, N,N-di-n-butylaminomethyl radical, and especially the N,N-di-n-butylaminomethyl radical.

Siloxanes (A) used in accordance with the invention are already known and can be prepared, for example, by reacting α,ω-dihydroxydiorganopolysiloxanes (A0) with silanes of the formula (III). If desired, the component (A) can also be prepared in situ during the production of the compositions according to the invention. The α,ω-dihydroxydiorganopolysiloxanes (A0) used to prepare the component (A)

used in accordance with the invention are preferably those having a molecular weight Mn of less than 45,000 g/mol, more preferably less than 40,000 g/mol, and especially less than 35,000 g/mol, most preferably less than 30,000 g/mol.

The units of the formula (I) present in the siloxanes (A) used in accordance with the invention are preferably essentially those where c=2. As a result of the preparation, the siloxanes (A) may also comprise units of the formula (I) where c is 1. The siloxanes (A) used in accordance with the invention preferably comprise at most one unit of the formula (I) where c is 1 per molecule, more preferably none of these units.

The siloxanes (A) used in accordance with the invention are preferably those of the formula

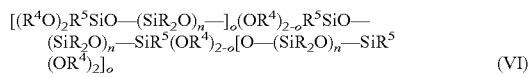

(VI)

where
o may be the same or different and denotes 0, 1 or 2 and n may be the same or different and is an integer from 10 to 600.

The —(SiR$_2$O)$_n$— segments in formula (VI) each independently preferably have a molecular weight Mn of less than 45,000 g/mol, more preferably less than 40,000 g/mol, especially less than 35,000 g/mol, and most preferably less than 30,000 g/mol.

Examples of siloxanes (A) used in accordance with the invention are
(EtO)$_2$[(n-C$_4$H$_9$)$_2$NCH$_2$]SiO—(SiMe$_2$O)$_x$—Si[CH$_2$N(n-C$_4$H$_9$)$_2$](OEt)$_2$,
(EtO)$_2$[(n-C$_4$H$_9$)$_2$NCH$_2$]SiO—(SiMe$_2$O)$_x$(OEt)[(n-C$_4$H$_9$)$_2$NCH$_2$]SiO—(SiMe$_2$O)$_x$—Si[CH$_2$N(n-C$_4$H$_9$)$_2$](OEt)$_2$,
(EtO)$_2$[(n-C$_4$H$_9$)$_2$NCH$_2$]SiO—(SiMe$_2$O)$_x$(OEt)[(n-C$_4$H$_9$)$_2$NCH$_2$]SiO—(SiMe$_2$O)$_x$—Si[CH$_2$N(n-C$_4$H$_9$)$_2$](OEt)-(SiMe$_2$O)$_x$—Si[CH$_2$N(n-C$_4$H$_9$)$_2$](OEt)$_2$,
[(EtO)$_2$[(n-C$_4$H$_9$)$_2$NCH$_2$]SiO—(SiMe$_2$O)$_x$]$_2$[(n-C$_4$H$_9$)$_2$NCH$_2$]SiO—(SiMe$_2$O)$_x$—Si[CH$_2$N(n-C$_4$H$_9$)$_2$](OEt)$_2$,
[(EtO)$_2$[(n-C$_4$H$_9$)$_2$NCH$_2$]SiO—(SiMe$_2$O)$_x$]$_2$[(n-C$_4$H$_9$)$_2$NCH$_2$]SiO—(SiMe$_2$O)$_x$—Si[CH$_2$N(n-C$_4$H$_9$)$_2$](OEt)-(SiMe$_2$O)$_x$—Si[CH$_2$N(n-C$_4$H$_9$)$_2$](OEt)$_2$ and
[(EtO)$_2$[(n-C$_4$H$_9$)$_2$NCH$_2$]SiO—(SiMe$_2$O)$_x$]$_2$[(n-C$_4$H$_9$)$_2$NCH$_2$]SiO—(SiMe$_2$O)$_x$—Si[CH$_2$N(n-C$_4$H$_9$)$_2$][—(SiMe$_2$O)$_x$—Si[CH$_2$N(n-C$_4$H$_9$)$_2$](OEt)$_2$]$_2$, wherein preference is given to (EtO)$_2$[(n-C$_4$H$_9$)$_2$NCH$_2$]SiO—(SiMe$_2$O)$_x$—Si[CH$_2$N(n-C$_4$H$_9$)$_2$](OEt)$_2$ or (EtO)$_2$[(n-C$_4$H$_9$)$_2$NCH$_2$]SiO—(SiMe$_2$O)$_x$(OEt)[(n-C$_4$H$_9$)$_2$NCH$_2$]SiO—(SiMe$_2$O)$_x$—Si[CH$_2$N(n-C$_4$H$_9$)$_2$](OEt)$_2$, and
particular preference is given to (EtO)$_2$[(n-C$_4$H$_9$)$_2$NCH$_2$]SiO—(SiMe$_2$O)$_x$—Si[CH$_2$N(n-C$_4$H$_9$)$_2$](OEt)$_2$, where Me is a methyl radical, Et is an ethyl radical and x may be the same or different and denotes an integer from 10 to 405.

The siloxanes (A) used in accordance with the invention are preferably liquid at 25° C. and 1000 hPa.

The siloxanes (A) used in accordance with the invention preferably have viscosities from 4000 mPas to 10,000 mPas, measured at 25° C.

Silanes (B) present in the compositions according to the invention are already known and can be readily prepared by methods common in silicon chemistry.

Examples of silanes (B) used in accordance with the invention are
N,N-dimethylaminomethyltriethoxysilane, N,N-diethylaminomethyltriethoxysilane, N,N-di-n-propylaminomethyltriethoxysilane, N,N-di-n-butylaminomethyltriethoxysilane, N-n-butylaminomethyltriethoxysilane, N-but-2-ylaminomethyltriethoxysilane, N-cyclopentylaminomethyltriethoxysilane, N-cyclohexylaminomethyltriethoxysilane, N,N-dimethylaminomethyltrimethoxysilane, N,N-diethylaminomethyltrimethoxysilane, N,N-di-n-propylaminomethyltrimethoxysilane, N,N-di-n-butylaminomethyltrimethoxysilane, N-n-butylaminomethyltrimethoxysilane, N-but-2-ylaminomethyltrimethoxysilane and N-cyclopentylaminomethyltrimethoxysilane, N-cyclohexylaminomethyltrimethoxysilane and partial hydrolysates thereof, wherein preference is given to N,N-dimethylaminomethyltriethoxysilane, N,N-diethylaminomethyltriethoxysilane, N,N-di-n-propylaminomethyltriethoxysilane, N,N-di-n-butylaminomethyltriethoxysilane, N-cyclopentylaminomethyltriethoxysilane or N-cyclohexylaminomethyltriethoxysilane or partial hydrolysates thereof and
particular preference is given to N,N-diethylaminomethyltriethoxysilane, N,N-di-n-butylaminomethyltriethoxysilane or N-cyclohexylaminomethyltriethoxysilane or partial hydrolysates thereof.

In the case that the component (B) takes the form of partial hydrolysates of silanes of the formula (III), preference is given to partial hydrolysates having 2 to 10 silicon atoms.

The compositions according to the invention preferably comprise component (B) in amounts of 5 to 15 parts by weight, more preferably 5 to 10 parts by weight, based in each case on 100 parts by weight of component (A).

The siloxanes (C) used in accordance with the invention are already known and are commercially available, for example under the name WACKER® TES 40 from Wacker Chemie AG, Munich, Germany.

Examples of siloxanes (C) are

where Mw=2400 g/mol, Mn=900 g/mol and Mw/Mn=2.7,

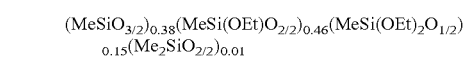

where Mw=2800 g/mol, Mn=1000 g/mol and Mw/Mn=2.8,

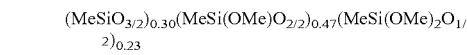

where Mw=2300 g/mol, Mn=600 g/mol and Mw/Mn=3.8,

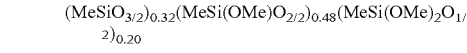

where Mw=3300 g/mol, Mn=900 g/mol and Mw/Mn=3.7,

where Mw=1000 g/mol, Mn=800 g/mol and Mw/Mn=1.2,

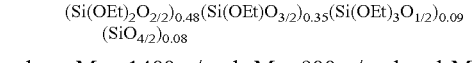

where Mw=1400 g/mol, Mn=900 g/mol and Mw/Mn=1.6,

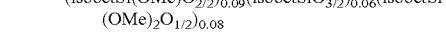

where Mw=1400 g/mol, Mn=600 g/mol and Mw/Mn=2.3 and

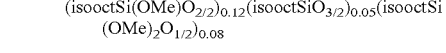

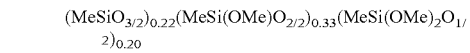

where Mw=1600 g/mol, Mn=700 g/mol and Mw/Mn=2.3, where Me denotes a methyl radical, Et denotes an ethyl radical and isooct denotes a 2,4,4-trimethylpentyl radical.

The siloxanes (C) are preferably those of the formula (IV) where $R^6$ is a methyl radical (Me), $R^7$ is an ethyl radical (Et), a is 0 or 1 and b is 1, 2 or 3, such as, for example

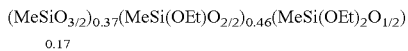

where Mw=2400 g/mol, Mn=900 g/mol and Mw/Mn=2.7,

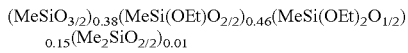

where Mw=2800 g/mol, Mn=1000 g/mol and Mw/Mn=2.8,

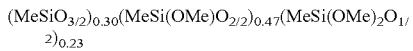

where Mw=2300 g/mol, Mn=600 g/mol and Mw/Mn=3.8,

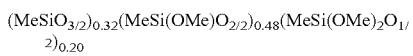

where Mw=3300 g/mol, Mn=900 g/mol and Mw/Mn=3.7,

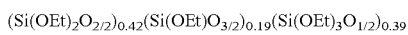

where Mw=1000 g/mol, Mn=800 g/mol and Mw/Mn=1.2 or

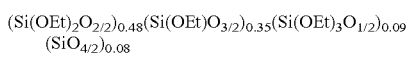

where Mw=1400 g/mol, Mn=900 g/mol and Mw/Mn=1.6, particular preference being given to organosiloxanes of the formula (IV) where $R^7$=Et and a=0, such as, for example

where Mw=1000 g/mol, Mn=800 g/mol and Mw/Mn=1.2 or

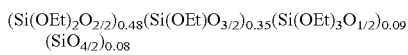

where Mw=1400 g/mol, Mn=900 g/mol and Mw/Mn=1.6.

The organosiloxanes (C) preferably have a weight average Mw of preferably 500 to 10,000 g/mol, more preferably 500 to 8000 g/mol.

The organosiloxanes (C) preferably have a number average Mn of preferably 200 to 5000 g/mol, more preferably 200 to 3000 g/mol.

The organosiloxanes (C) preferably have polydispersities Mw/Mn of 1 to 5, more preferably 1 to 4.

In the present invention, weight average Mw and number average Mn, rounded to the nearest 100 whole number, according to DIN 1333:1992-02 paragraph 4, are determined by gel permeation chromatography (GPC or Size Exclusion Chromatography (SEC)) according to DIN 55672-1 using polystyrene standard and refractive index detector (RI detector). Unless stated otherwise, THF is used as eluent for phenyl-containing components and toluene as eluent for non-phenyl-containing components, and the analyses are carried out at a column temperature of 45° C. The polydispersity is the quotient Mw/Mn.

Organosiloxanes (C) are preferably liquid at 25° C. and 1000 hPa.

The compositions according to the invention preferably comprise component (C) in amounts of 1 to 20 parts by weight, more preferably 4 to 10 parts by weight, based in each case on 100 parts by weight of component (A).

The organosilicon compounds (D) used in accordance with the invention may be either silanes, i.e. compounds of the formula (V) where d+e+f=4, or siloxanes, i.e. compounds comprising units of the formula (V) where d+e+f≤3, wherein preference is given to silanes.

Examples of radicals D are those of the formulae $H_2NCH_2—$, $H_2N(CH_2)_3—$, $H_2N(CH_2)_2NH(CH_2)_3—$, $H_2N(CH_2)_2NH(CH_2)_3NH(CH_2)_3—$, $H_3CNH(CH_2)_3—$, $C_2H_5NH(CH_2)_3—$, $H_2N(CH_2)_4—$, $H_2N(CH_2)_5—$, $H(NHCH_2CH_2)_2—(CH_2)_3—$, $C_4H_9NH(CH_2)_2NH(CH_2)_3—$, cyclo-$C_6H_{11}NH(CH_2)_3—$, $(CH_3)_2N(CH_2)_3—$ and $(C_2H_5)_2N(CH_2)_3—$.

The radical D is preferably a $H_2N(CH_2)_3—$, $H_2N(CH_2)_2NH(CH_2)_3—$, $H_3CNH(CH_2)_3—$, $C_2H_5NH(CH_2)_3—$ or cyclo-$C_6H_{11}NH(CH_2)_3—$ radical, more preferably a $H_2N(CH_2)_2NH(CH_2)_3—$ or cyclo-$C_6H_{11}NH(CH_2)_3—$ radical, especially the $H_2N(CH_2)_2NH(CH_2)_3—$ radical.

Examples of organosilicon compounds (D) are 3-aminopropyltrimethoxysilane, 3-(2-aminoethyl)aminopropyltrimethoxysilane, 3-aminopropyltriethoxysilane, 3-(2-amino-ethyl)aminopropyltriethoxysilane, 3-aminopropyldimethoxymethyl-silane, 3-(2-aminoethyl)aminopropyldiethoxymethylsilane, 3-aminopropyldiethoxymethylsilane, 3-(2-aminoethyl)aminopropyl-diethoxymethylsilane, 3-aminopropyl(methyl)silsesquioxane, ethoxy-terminated (CAS number 128446-60-6), poly[3-(2-amino-ethyl)aminopropyl]methylsiloxane, hydroxy-terminated (CAS number 106214-80-6) and 3-(2-aminoethyl) aminopropylsiloxane-dimethylsiloxane copolymer (CAS number 67923-07-3).

The component (D) is preferably 3-aminopropyltriethoxysilane, 3-(2-aminoethyl)aminopropyltrimethoxysilane, 3-(2-aminoethyl)-aminopropyldiethoxymethylsilane, 3-aminopropyl(methyl)-silsesquioxane, ethoxy-terminated (CAS number 128446-60-6) or 3-(2-aminoethyl)aminopropylsiloxane-dimethylsiloxane copolymer (CAS number 67923-07-3), wherein particular preference is given to 3-(2-aminoethyl)aminopropyltrimethoxysilane, 3-aminopropyl-(methyl)silsesquioxane, ethoxy-terminated (CAS number 128446-60-6) or 3-(2-aminoethyl)aminopropylsiloxane-dimethylsiloxane copolymer (CAS number 67923-07-3).

The compositions according to the invention preferably comprise component (D) in amounts of 0.1 to 1.5 parts by weight, more preferably 0.1 to 1.0 parts by weight, especially 0.3 to 0.8 parts by weight, based in each case on 100 parts by weight of component (A).

The organosilicon compounds (D) used in accordance with the invention are already known and can be prepared by methods common in chemistry or are commercially available under the names GENIOSIL® GF 91, GENIOSIL® GF 93, GENIOSIL® GF 94, GENIOSIL® GF 95, GENIOSIL® GF 96, and WACKER HAFTVERMITTLER AMS 60, WACKER HAFTVERMITTLER AMS 70, from WACKER Chemie AG.

In addition to the components (A), (B), (C) and (D) described above, the compositions according to the invention may comprise any substances which have also been used hitherto in compositions cross-linkable by a condensation reaction, such as e.g. organic solvents (E), fillers (F), pigments (G), plasticizers (H) and catalysts (I).

The compositions according to the invention preferably do not comprise any further constituents beyond the components (A) to (I).

Examples of optionally present component (E) are saturated hydrocarbons having 6 to 20 carbon atoms, which may be linear, branched or cyclic, such as hydrocarbon mixtures which are combined under the CAS number 64742-47-8.

The solvents (E) are preferably hydrocarbon mixtures consisting of saturated hydrocarbons having 6 to 20 carbon atoms, selected from branched and cyclic compounds.

Solvents (E) are preferably liquid at 25° C. and 1000 hPa.

Solvents (E) preferably have an initial boiling point (IBP) in the temperature range from 90° C. to 270° C. (ASTM D 86) and a dry point (DP) in the temperature range from 100° C. to 310° C. (ASTM D 86).

The optional solvents (E) have a density at 15.6° C. in the range from 0.699 to 0.831 g/cm$^3$ (EN ISO 12185), and preferably have a kinematic viscosity at 40° C. of 0.5 mm$^2$/s to 8 mm$^2$/s, more preferably 2 mm$^2$/s to 5 mm$^2$/s (ASTM D 445).

If the compositions according to the invention comprise component (E), it is preferably present in amounts of preferably 5 to 30 parts by weight, more preferably 10 to 20 parts by weight, based in each case on 100 parts by weight of organosiloxane (A). The compositions according to the invention preferably comprise component (E).

Examples of component (F) optionally present are reinforcing fillers such as carbon black and silicas, wherein preference is given to silicas and particular preference to fumed silicas.

The silicas (F) used in accordance with the invention may be surface-treated. In particular, the fumed silicas (F) are fumed silicas surface-modified with trimethylsiloxy groups.

If the compositions according to the invention comprise component (F), it is preferably present in amounts of preferably 5 to 30 parts by weight, more preferably 8 to 15 parts by weight, based in each case on 100 parts by weight of organosiloxane (A). The compositions according to the invention preferably comprise component (F).

Examples of optional component (G) are inorganic pigments such as titanium dioxide and yellow, red and black iron oxide pigments.

If the compositions according to the invention comprise component (G), it is preferably present in amounts of 0.5 to 2 parts by weight, based on 100 parts by weight of the mixture of the constituents (A), (B), (C) and (D).

The optional plasticizer (H) is preferably a diorganyl-polysiloxanes end-blocked by triorganylsiloxy groups, more preferably dimethylpolysiloxanes end-blocked by trimethylsiloxy groups.

Component (H) is preferably liquid at 25° C. and 1000 hPa.

In particular, plasticizers (H) are dimethylpolysiloxanes that are end-blocked by trimethylsiloxy groups and are liquid at 25° C. and 1000 hPa.

Plasticizers (H) preferably have a viscosity at 25° C. in the range between 5 and 1000 mPas, more preferably 35 to 100 mPas.

If the compositions according to the invention comprise a H), it is preferably present in amounts of 5 to 20 parts by weight, more preferably 5 to 10 parts by weight, based in each case on 100 parts by weight of organosiloxane (A). The compositions according to the invention preferably comprise plasticizers (H).

Catalysts (I) which are optionally present can be any compounds used hitherto for moisture-curing systems such as, for example, diorganotin compounds, titanium alkoxylates, titanium chelates, zinc (2-ethylhexanoate), or bismuth (III) (2-ethylhexanoate).

The compositions according to the invention preferably do not comprise any metal-containing catalysts (I). The compositions according to the invention most preferably do not comprise any catalysts (I).

The compositions according to the invention are preferably those comprising
(A) organosiloxanes consisting of units of the formulae (I) and (II), with the proviso that at least two R$^5$ radicals and at least four (OR$^4$) groups are present per molecule,
(B) silanes of the formula (III) and/or partial hydrolysates thereof in amounts of 5 to 20 parts by weight, based on 100 parts by weight of component (A),
(C) organosiloxanes consisting of units of the formula (IV), with the proviso that, in formula (IV), the sum of a+b is <4, the organosiloxane has 2 to 30 units of the formula (IV) and at least one unit is present per molecule where b is other than 0, in amounts of 1 to 30 parts by weight, based on 100 parts by weight of component (A),
(D) organosilicon compounds comprising units of the formula (V), with the proviso that the sum of d+e+f is less than or equal to 4, at least one radical D is present per molecule and at least one radical D bears an NH$_2$ group per molecule, in amounts of 0.1 to 2 parts by weight, based on 100 parts by weight of component (A),
and also at least one component selected from
(E) organic solvents,
(F) fillers,
(G) pigments and
(H) plasticizers.

In addition, the compositions according to the invention are preferably those comprising
(A) organosiloxanes consisting of units of the formulae (I) and (II), with the proviso that at least two R$^5$ radicals and at least four (OR$^4$) groups are present per molecule,
(B) silanes of the formula (III) and/or partial hydrolysates thereof in amounts of 5 to 20 parts by weight, based on 100 parts by weight of component (A),
(C) organosiloxanes consisting of units of the formula (IV), with the proviso that, in formula (IV), the sum of a+b is <4, the organosiloxane has 2 to 30 units of the formula (IV) and at least one unit is present per molecule where b is other than 0, in amounts of 1 to 30 parts by weight, based on 100 parts by weight of component (A),
(D) organosilicon compounds comprising units of the formula (V), with the proviso that the sum of d+e+f is less than or equal to 4, at least one radical D is present per molecule and at least one radical D bears an NH$_2$ group per molecule, in amounts of 0.1 to 2 parts by weight, based on 100 parts by weight of component (A),
(E) organic solvents,
optionally (F) fillers,
optionally (G) pigments and
optionally (H) plasticizers.

In addition, the compositions according to the invention are preferably those comprising
(A) organosiloxanes consisting of units of the formulae (I) and (II), with the proviso that at least two R$^5$ radicals and at least four (OR$^4$) groups are present per molecule,
(B) silanes of the formula (III) and/or partial hydrolysates thereof in amounts of 5 to 20 parts by weight, based on 100 parts by weight of component (A),
(C) organosiloxanes consisting of units of the formula (IV), with the proviso that, in formula (IV), the sum of a+b is <4, the organosiloxane has 2 to 30 units of the formula (IV) and at least one unit is present per molecule where b is other than 0, in amounts of 1 to 30 parts by weight, based on 100 parts by weight of component (A),
(D) organosilicon compounds comprising units of the formula (V), with the proviso that the sum of d+e+f is less than or equal to 4, at least one radical D is present per molecule and at least one radical D bears an NH$_2$ group per molecule, in amounts of 0.1 to 2 parts by weight, based on 100 parts by weight of component (A),
(E) organic solvents,
(F) fillers,
optionally (G) pigments and optionally (H) plasticizers.

In addition, the compositions according to the invention are preferably those comprising
(A) organosiloxanes consisting of units of the formulae (I) and (II), with the proviso that at least two $R^5$ radicals and at least four $(OR^4)$ groups are present per molecule,
(B) silanes of the formula (III) and/or partial hydrolysates thereof in amounts of 5 to 20 parts by weight, based on 100 parts by weight of component (A),
(C) organosiloxanes consisting of units of the formula (IV), with the proviso that, in formula (IV), the sum of a+b is <4, the organosiloxane has 2 to 30 units of the formula (IV) and at least one unit is present per molecule where b is other than 0, in amounts of 1 to 30 parts by weight, based on 100 parts by weight of component (A),
(D) organosilicon compounds comprising units of the formula (V), with the proviso that the sum of d+e+f is less than or equal to 4, at least one radical D is present per molecule and at least one radical D bears an $NH_2$ group per molecule, in amounts of 0.1 to 2 parts by weight, based on 100 parts by weight of component (A),
(E) organic solvents,
optionally (F) fillers,
optionally (G) pigments and
(H) plasticizers.

In addition, the compositions according to the invention are preferably those comprising
(A) organosiloxanes consisting of units of the formulae (I) and (II), with the proviso that at least two $R^5$ radicals and at least four $(OR^4)$ groups are present per molecule,
(B) silanes of the formula (III) and/or partial hydrolysates thereof in amounts of 5 to 20 parts by weight, based on 100 parts by weight of component (A),
(C) organosiloxanes consisting of units of the formula (IV), with the proviso that, in formula (IV), the sum of a+b is <4, the organosiloxane has 2 to 30 units of the formula (IV) and at least one unit is present per molecule where b is other than 0, in amounts of 1 to 30 parts by weight, based on 100 parts by weight of component (A),
(D) organosilicon compounds comprising units of the formula (V), with the proviso that the sum of d+e+f is less than or equal to 4, at least one radical D is present per molecule and at least one radical D bears an $NH_2$ group per molecule, in amounts of 0.1 to 2 parts by weight, based on 100 parts by weight of component (A),
(E) organic solvents,
(F) fillers,
optionally (G) pigments and
(H) plasticizers.

The individual constituents of the compositions according to the invention may in each case be one type of a constituent of this kind and also a mixture of at least two different types of such constituents.

The compositions according to the invention preferably have viscosities preferably of 1000 mPas to 50,000 mPas, more preferably 1000 mPas to 20,000 mPas, and especially 1000 mPas to 5000 mPas, in each case at 25° C.

To prepare the compositions according to the invention, all constituents may be mixed with one another in any sequence. This mixing can be carried out at room temperature and at ambient atmospheric pressure, i.e. about 900 to 1100 hPa, or under reduced pressure of about 20 hPa to 800 hPa. If desired, this mixing can also be carried out at higher or lower temperatures, for example at temperatures in the range of 15 to 135° C. If desired, it can be heated or cooled.

The present invention further provides a process for producing the compositions according to the invention by mixing the individual components in any sequence.

A preferred embodiment of the process according to the invention consists of firstly mixing α,ω-dihydroxypolydimethylsiloxanes (A0) together with silanes of the formula (III) in molar excess, preferably 5 to 10 mol of silane of the formula (III) per mole of siloxane (A0), and leaving them to react with elimination of the alcohol $R^4OH$, where $R^4$ has the same definition specified above, wherein a mixture of organosiloxanes (A) and excess silanes of the formula (III) is obtained, and then any further components are added to this mixture in any desired sequence.

According to a further preferred embodiment of the process according to the invention, in a first stage α,ω-dihydroxypolydimethylsiloxanes (A0) and silanes of the formula (III) are mixed together in molar excess, preferably 5 to 10 mol of silane of the formula (III) per mole of siloxane (A0), and left to react at reduced pressure, preferably at 20 to 200 hPa, and elevated temperature, preferably in the range of 50 to 100° C., and the mixture is freed from alcohol $R^4OH$ formed in the reaction of the two components, and then in a second stage any further components are added in any desired sequence to the mixture thus obtained at a pressure of 900 to 1100 hPa and a temperature of 15 to 60° C.

A further preferred embodiment of the process according to the invention consists of firstly mixing α,ω-dihydroxypolydimethylsiloxanes (A0) with all components other than the silane of the formula (III) in any sequence and finally adding the silane of the formula (III). In this case, it is completely immaterial whether the reaction of the α,ω-dihydroxypolydimethylsiloxane (A0) with the silane of the formula (III) has already gone to completion before further components are added.

The compositions according to the invention or produced according to the invention are storage-stable under exclusion of water and cross-link on contact with water, preferably even at ambient temperature.

The compositions according to the invention are therefore perfectly suitable as coatings for many different construction materials. The application is predominantly carried out outdoors. Applications indoors are however also possible.

For cross-linking the compositions according to the invention, the standard water content of air is sufficient. The production of the coating and the subsequent cross-linking of the compositions according to the invention is preferably carried out at +5° to +50° C.

The cross-linking of the compositions according to the invention is preferably carried out at ambient atmospheric pressure, i.e. about 900 to 1100 hPa.

The cross-linking of the compositions according to the invention is preferably carried out at a relative air humidity of 10-90%, particularly preferably at 30-70%.

The present invention further provides moldings, produced by cross-linking the compositions according to the invention.

During curing, the compositions according to the invention have skin formation times preferably between 5 minutes and 120 minutes.

The cured moldings producible from the compositions according to the invention preferably have tensile strengths of 0.25 MPa to 1.50 MPa, measured in accordance with DIN 51504 on the specimen shape S2.

The compositions according to the invention are perfectly suitable, for example, for treating any subsurfaces, especially buildings of all types.

The invention further provides a process for treating substrates, especially against soiling, in which the compositions according to the invention or produced according to the invention are applied to the substrates and are left to cross-link.

Examples of substrates which can be treated with the compositions according to the invention are mineral substances such as masonry, mortar, plaster, bricks, limestone, lime-sandstone, sandstone and natural stones such as granite, marble and porphyry, glass, concrete and porous concrete, painted metal surfaces and organic substances such as wood, and epoxy resin, polyurethane and polyester coatings.

The substrates are preferably mineral substances.

The substrates used in accordance with the invention may have different porosities. A measure of porosity can be, for example, the water absorption coefficient, which is described in "Lehrbuch der Bauphysik" [Textbook of Building Physics], by Lutz, Jenisch, Klopfer, Freymuth, Krampf and Petzold, publisher B. G Teubner, 4th edition of 1997, page 354. The substrates can then be strongly absorbent, water-inhibiting, water-repellent and waterproof.

In the process according to the invention, the cross-linkable compositions are placed on the surface of the substrates by common and hitherto known methods of distribution such as, e.g. by painting, injecting, scraping, rolling, spraying, brushing, pouring, applying with a spatula, dipping and applying with rollers.

In the process according to the invention, the composition according to the invention is preferably used in amounts of from 100 to 400 g, based on 1 m² of substrate surface area.

In order to achieve good adhesion, the substrate surface is preferably initially freed of all loose soil and grease and loose construction materials such as, for example, loose adhering sand on plaster surfaces or the so-called slurry on concrete surfaces.

The substrates used in accordance with the invention are preferably largely dry, wherein a low residual moisture content of the substrate is no problem in terms of carrying out the process according to the invention. Whether the degree of dryness of the substrate is sufficient can optionally be determined by preliminary tests, since the environmental conditions during application outdoors may vary very widely. The substrate surfaces are preferably not completely soaked with water. On highly absorbent or water-inhibiting surfaces, there is preferably no visible water layer. In addition, there are preferably also no water droplets on waterproof substrates.

If desired, in order to achieve good adhesion of the coating to the appropriate subsurface, the subsurface can be pre-treated with an adhesive-improving agent, a so-called adhesion promoter, also known as a primer, in accordance with the prior art. However, preferably no pre-treatment with a primer is required.

In accordance with the process according to the invention, the composition applied to the substrate is left to cross-link.

The compositions according to the invention are no longer adhesive after a cross-linking time of preferably 30 minutes to 24 hours on the substrate surface.

The substrates treated in accordance with the invention can now be easily freed of surface contaminants such as paints, tar, soot and especially so-called graffiti.

To remove the surface contaminants, the surface bearing the soiling can be removed purely mechanically, for example by scrubbing or wiping off with water or using a high-pressure water jet.

Preference is given to removal of the surface contaminant, especially graffiti, by means of treatment with water, preferably at a temperature of less than 80° C., more preferably 1 to 60° C., wherein the surface contaminant, especially graffiti, can be completely or partially removed by simple washing off, rubbing off or using a water jet at a pressure of at most 200 bar.

The invention is based on the surprising discovery that the compositions according to the invention have both the good mechanical properties required for a coating composition and excellent anti-graffiti properties.

Moreover, it is particularly surprising that the compositions according to the invention adhere very well to many subsurfaces, but graffiti or other surface contaminants adhere very poorly to the surface of the coating.

The compositions according to the invention have the advantage that they can be applied without difficulty during highly variable ambient conditions with respect to the temperature and air humidity and can be applied both at low temperature and low absolute air humidity and also at high temperature and high absolute air humidity and non-sticky surfaces are obtained after a short period.

A further advantage of the compositions according to the invention is that they are highly storage-stable and the properties change only insignificantly on storage.

Furthermore, the compositions according to the invention have the advantage that the viscosity thereof does not change, or only to such a degree that the applicability is not impaired.

Also the curing characteristics of the compositions according to the invention advantageously do not change significantly during storage. The mechanical properties of coatings which are produced from compositions that have been stored for longer do not differ, or differ only insignificantly, from the mechanical properties of coatings that are obtained from freshly prepared compositions.

The process according to the invention for producing the cross-linkable compositions has the advantage that it is simple to carry out.

In the coating of substrates, the compositions according to the invention are characterized by simple applicability, which can be carried out by rolling, spraying or brushing.

The coating according to the invention after application is characterized by rapid curing by the effect of moisture in the air.

The coating according to the invention is characterized by an exceptionally low surface energy which is why other substances adhere only very poorly. For instance, graffiti can be washed off with cold water with the aid of a sponge or commercially available high-pressure cleaner, without having to use a special detergent. Posters or placards drop off either of their own accord under their own weight or can be removed effortlessly.

The coating according to the invention is characterized by a high degree of permanence. The anti-graffiti protective effect remains completely intact even after 20 cleaning cycles.

An advantage of the anti-graffiti coatings according to the invention is that they have a high degree of permanence and good water vapor permeability and meet high optical requirements.

The coating according to the invention is characterized by good and durable adhesion to all common porous mineral or non-porous subsurfaces, and also to wood and epoxy resin coatings, without having to treat the subsurfaces beforehand with a primer.

The coating according to the invention has the advantage of being breathable so that water vapor can penetrate.

Therefore, the coating according to the invention can also be used on incompletely dried, slightly moist subsurfaces or remoisturizing subsurfaces.

The coating according to the invention is surprisingly characterized by high durability even on exposure to UV radiation, during freeze-thaw cycles and also in the case of regular sprinkling.

The coatings according to the invention have the advantage that they feature good mechanical properties, particularly a high elasticity even at low temperatures.

In the examples described below, all viscosity data refer to a temperature of 25° C. Unless otherwise stated, the following examples are conducted at ambient atmospheric pressure, i.e. at about 1000 hPa, and at room temperature, i.e. at about 23° C., or at a temperature which is set on combining the reactants at room temperature without additional heating or cooling, and at a relative air humidity of about 50%. In addition, unless stated otherwise, all figures relating to parts or percentages refer to weight.

The following reactants were used in the examples:
OH-Siloxane 1: α,ω-dihydroxypolydimethylsiloxane of the average formula $HO(Si(CH_3)_2O)_{380}H$ having an average molar mass (number average $M_n$) of 28,138 g/mol and having a viscosity of 6000 mPas;
OH-Siloxane 2: α,ω-dihydroxypolydimethylsiloxane of the average formula $HO(Si(CH_3)_2O)_{262}H$ having an average molar mass (number average $M_n$) of 19 406 g/mol and having a viscosity of 2000 mPas;
Alkane solvent: hydrocarbon mixture consisting of isoalkanes having 11 to 16 carbon atoms, an initial distillation point of 227° C. (ASTM D 86), a final distillation point at 254° C. (ASTM D 86), a density of 0.79 g/cm$^3$ at 15.6° C. (EN ISO 12185) and a kinematic viscosity of 2.72 mm$^2$/s at 40° C. (ASTM D 445) (commercially available under the name Isopar® M from Exxon Mobile);
Siloxane H: α-trimethylsilyl-ω-trimethylsiloxypolydimethylsiloxane having a viscosity of 100 mPas;
Silica filler: fumed silica surface-modified by trimethylsiloxy groups having a carbon content of 2.3-3.2% by weight (in accordance with DIN ISO 10694), a tamped density of 100 to 250 g/l (in accordance with DIN EN ISO 787-11) and having a BET surface area of 190 to 210 m$^2$/g for the fumed silica prior to the surface treatment (commercially available under the name HDK® H2000 from Wacker Chemie AG, Munich, Germany);
Silane hydrolysate: oligomeric tetraethoxysilane hydrolysate having a density at 20° C. (DIN 51757) of 1.06 to 1.07 g/cm$^3$, a flash point (DIN 51755) of 62° C. and an $SiO_2$ content of about 41% (commercially available under the name WACKER® TES 40 from Wacker Chemie AG, Munich, Germany).

Viscosity

The viscosities specified in this invention were measured in accordance with DIN 53019 unless stated otherwise. This was carried out as follows: the viscosity is measured, unless stated otherwise, at 25° C. by means of a "Physica MCR 300" rotational rheometer from Anton Paar. In this case, for viscosities of 1 to 200 mPa·s, a coaxial cylinder measuring system (CC 27) having a ring measurement gap of 1.13 mm is used and for viscosities of greater than 200 mPa·s, a cone-plate measuring system (Searle system with measuring cone CP 50-1) is used. The shear rate is adjusted to the polymer viscosity (1 to 99 mPa·s at 100 s$^{-1}$; 100 to 999 mpa·s at 200 s$^{-1}$; 1000 to 2999 mPa·s at 120 s$^{-1}$; 3000 to 4999 mpa·s at 80 s$^{-1}$; 5000 to 9999 mPa·s at 62 s$^{-1}$; 10,000 to 12,499 mPa·s at 50 s$^{-1}$; 12,500 to 15,999 mPa·s at 38.5 s$^{-1}$; 16,000 to 19,999 mpa·s at 33 s$^{-1}$; 20,000 to 24 999 mpa·s at 25 s$^{-1}$; 25,000 to 29,999 mpa·s at 20 s$^{-1}$; 30,000 to 39,999 mpa·s at 17 s$^{-1}$; 40,000 to 59,999 mpa·s at 10 s$^{-1}$; 60,000 to 149,999 mpa·s at 5 s$^{-1}$; 150,000 to 199,999 mpa·s at 3.3 s$^{-1}$; 200,000 to 299,999 mpa·s at 2.5 s$^{-1}$; 300,000 to 1,000,000 mpa·s at 1.5 s$^{-1}$.

After adjusting the temperature of the measurement system to the measurement temperature, a three-stage measurement program consisting of a run-in phase, a pre-shearing and a viscosity measurement is applied. The run-in phase takes place by step-wise increase of the shear rate within one minute to the above-stated shear rate which is dependent on the viscosity to be expected and in which the measurement is intended to be carried out. As soon as this is reached, the pre-shearing is carried out at constant shear rate for 30 s, then 25 individual measurements for 4.8 s each are carried out to determine the viscosity, from which the average value is determined. The average value corresponds to the dynamic viscosity which is given in mpa·s.

Skin Formation Time

The material to be investigated is exposed at 23° C. to a relative air humidity of 50%, whereupon curing of the surface takes place. At intervals of 1 min, the surface is then touched lightly with a finger and the finger is immediately lifted off again. It is then assessed whether composition remained stuck to the finger or not. The skin formation time is reached when composition no longer remains stuck to the finger. This method has a precision of only about +−2 minutes, but this is fully adequate for the purpose.

Tack-Free State

After a skin has formed, the skin is touched with the finger after 30 min, hourly from 1 hour to 7 hours and after 24 hours. If after the specified times the skin feels tack-free, the tack-free state has been reached.

The mechanical properties of the moldings obtained after curing the mixtures according to the invention were determined in accordance with DIN 51504. The hardness of the moldings was determined in accordance with DIN 53505. To determine the mechanical properties, the mixture was poured up to the brim into a PTFE mold having a circular recess with a diameter of 20 cm and a depth of 5 mm and the material was stored for 7 days at 25° C. and 50% relative air humidity. Specimens of the S2 shape were punched out and the tensile strength, elongation at break and the strain at 100% elongation were determined in accordance with DIN 53504.

EXAMPLE 1

224.1 g of OH-siloxane 1 and 173.0 g of OH-siloxane 2 were mixed, 37.8 g of N,N-dibutylaminomethyltriethoxysilane were added and the mixture was stirred for 15 min at an ambient temperature of 25° C. and a pressure of about 1000 hPa in a mixer of the LabMax brand name from Molteni. This mixture had a viscosity of 5240 mPas after the reaction.

To the resulting mixture were added 25.9 g of siloxane H and 50.4 g of silica filler and the mixture was mixed at 25° C. at a stirring speed of 400 min$^{-1}$ for a further 10 minutes. Subsequently, 22.4 g of silane hydrolysate and 2.8 g of 3-(2-aminoethyl)aminopropyltrimethoxysilane were added and the mixture was mixed for a further 5 min at a stirring speed of 400 min$^{-1}$.

Finally, 63.3 g of the alkane solvent were added and the mixture was mixed for a further 25 minutes at a pressure of 100 hPa. In this case, the temperature of the mixture increased from 25° C. at the start to 45° C. This mixture was finally bottled in moisture-tight containers. The mixture had a viscosity of 9680 mPas.

The skin formation time was 15 min. The tack-free state was 4 hours. The tensile strength was 0.76 MPa, the elongation at break was 200%, the strain at 100% elongation was 0.43 MPa and the Shore A hardness was 26. The characterization of the mixture with respect to its anti-graffiti properties is described in example 2.

EXAMPLE 2

The composition obtained according to example 1 was applied to eight lime-sandstone plates (11×24 cm)—each 200 g/m²—with the aid of a paintbrush. In this case, the application amount was determined by weighing the lime-sandstone plates before and 1 h after coating respectively. Since the density of the cured coating is about 1 kg/l, a layer thickness arises therefrom of about 200 μm.

After a drying time of about four hours at 23° C. and an air humidity of 50%, the film was tack-free, and after 24 h various lacquer types (MIPA lacquer spray, 1K and 2K acrylic lacquer from MIPA SE, D-84051 Essenbach) were sprayed onto the cured product. Other regions of the coating were labeled with markers (Edding, Masterpiece 760PI Coversall from Molotow (Tacker)).

Subsequently, the sprayed and labeled plates were stored outdoors. Here, the plates were positioned at a 60° angle to the horizontal in an exactly south-west facing direction. After various storage times (1 day, 1 week, 6 months and 1 year), two plates were cleaned at a time. In the case of each first plate, the graffiti was removed manually using a moist tissue or sponge. From each of the second plates, the graffiti was removed using a high-pressure cleaner at 100 bar pump pressure and at a distance of 10 cm from the surface. The graffiti could be removed without leaving a residue from all plates, irrespective of the duration of the storage time in outdoor weather.

In the case of the plates that have each been stored for only 1 day, the procedure of the graffiti application and marker labeling, together with the cleaning off 24 h later, was repeated twenty times. In this case, no visible damage to the surface occurred. Even on the twentieth repetition, the graffiti and marker patterns could be removed exactly as problem-free and residue-free as in the case of the first cleaning step.

In addition to the cleaning properties, the sd value was determined in accordance with DIN EN ISO 7783-2. The film formed after 14 days curing at 23° C. and 50% rel. air humidity had an sd value of 0.25 m (at 200 g/m²), which corresponds to an average breathability.

EXAMPLE 3

The production of the mixture according to example 1 was repeated with the modification that, instead of the 37.8 g of N,N-dibutylaminomethyltriethoxysilane specified in example 1, now 35 g of N,N-dibutylaminomethyltriethoxysilane were added. This mixture had a viscosity of 6430 mPas after the reaction. To this mixture were added 25.9 g of siloxane H and 50.4 g of silica filler and the mixture was mixed at 25° C. at a stirring speed of 400 min$^{-1}$ for a further 10 minutes. Subsequently, 22.4 g of the silane hydrolysate and 2.8 g of 3-(2-aminoethyl)aminopropyltrimethoxysilane were added and the mixture was mixed at a stirring speed of 400 min$^{-1}$ for a further 5 min.

Finally, 63.3 g of the alkane solvent were added and the mixture was mixed for a further 25 minutes at a reduced pressure of 100 hPa. In this case, the temperature of the mixture increased from 25° C. at the start to 45° C. This mixture was finally bottled in moisture-tight containers. The mixture had a viscosity of 10,800 mPas.

The skin formation time was 15 min. The tack-free state was 4 hours. The tensile strength was 0.73 MPa, the elongation at break was 200%, the strain at 100% elongation was 0.41 MPa and the Shore A hardness was 25.

The characterization of the mixture with respect to its anti-graffiti properties was carried out as described in example 2. The surface contaminants could be completely removed in each case.

EXAMPLE 4

The production of the mixture according to example 1 was repeated with the modification that, instead of the 37.8 g of N,N-dibutylaminomethyltriethoxysilane specified in example 1, now 28 g of N,N-dibutylaminomethyltriethoxysilane were added. This mixture had a viscosity of 8700 mPas after the reaction. To this mixture were added 25.9 g of siloxane H and 50.4 g of silica filler and the mixture was mixed at 25° C. at a stirring speed of 400 min$^{-1}$ for a further 10 minutes. Subsequently, 22.4 g of the silane hydrolysate and 2.8 g of 3-(2-amino-ethyl)aminopropyltrimethoxysilane were added and the mixture was mixed at a stirring speed of 400 min$^{-1}$ for a further 5 min.

Finally, 63.3 g of the alkane solvent were added and the mixture was mixed for a further 25 minutes at a reduced pressure of 100 hPa. In this case, the temperature of the mixture increased from 25° C. at the start to 45° C. This mixture was finally bottled in moisture-tight containers. The mixture had a viscosity of 11,300 mPas.

The skin formation time was 10 min. The tack-free state was 5 hours. The tensile strength was 0.63 MPa, the elongation at break was 1500%, the strain at 100% elongation was 0.46 MPa and the Shore A hardness was 25.

The characterization of the mixture with respect to its anti-graffiti properties was carried out as described in example 2. The surface contaminants could be completely removed in each case.

EXAMPLE 5

To 258.7 g of OH-siloxane 1, 138.4 g of OH-siloxane 2 and 20.5 g of siloxane H were added 40.3 g of silica filler and the mixture was mixed for 10 min at 25° C. in a mixer of the LabMax brand name from Molteni at a stirring speed of 400 min$^{-1}$. Subsequently, 18.1 g of the silane hydrolysate, 36.1 g of N,N-dibutylaminomethyltriethoxysilane and 2.4 g of 3-(2-aminoethyl)aminopropyltrimethoxysilane were added and the mixture was mixed for 5 min at a stirring speed of 400 min$^{-1}$. Finally, 51.4 g of the alkane solvent were added and the mixture was mixed for a further 25 minutes at a reduced pressure of 100 hPa. In this case, the temperature of the mixture increased from 25° C. at the start to 45° C. This mixture was finally bottled in moisture-tight containers. The mixture had a viscosity of 3920 mPas.

The skin formation time was 10 min. The tack-free state was 6 hours. The tensile strength was 0.88 MPa, the elongation at break was 140%, the strain at 100% elongation was 0.63 MPa and the Shore A hardness was 27.

The characterization of the mixture with respect to its anti-graffiti properties was carried out as described in example 2. The surface contaminants could be completely removed in each case.

EXAMPLE 6

224.1 g of OH-siloxane 1 and 173.0 g of OH-siloxane 2 were mixed, 37.8 g of N,N-dibutylaminomethyltriethoxysilane were added and the mixture was stirred for 15 min at an ambient temperature of 25° C. in a mixer of the LabMax brand name from Molteni. This mixture was subsequently freed of alcohol formed at 80° C. and a reduced pressure of 100 mbar for 1 hour. The resulting mixture after the reaction had a viscosity of 6040 mPas and a flash point of 94° C. (in accordance with ISO 3679).

To the resulting mixture, cooled to 25° C., were then added 25.9 g of siloxane H and 50.4 g of silica filler and the mixture was mixed at 25° C. for a further 10 minutes at a stirring speed of 400 min$^{-1}$. Subsequently, 22.4 g of the silane hydrolysate and 2.8 g of 3-(2-aminoethyl)aminopropyltrimethoxy-silane were added and the mixture was mixed for a further 5 min at a stirring speed of 400 min$^{-1}$.

Finally, 63.3 g of the alkane solvent were added and the mixture was mixed for a further 25 minutes at a reduced pressure of 100 hPa. In this case, the temperature of the mixture increased from 25° C. at the start to 45° C. This mixture was finally bottled in moisture-tight containers. The mixture had a viscosity of 9680 mPas. The skin formation time was 15 min. The tack-free state was 4 hours. The tensile strength was 0.76 MPa, the elongation at break was 200%, the strain at 100% elongation was 0.43 MPa and the Shore A hardness was 26.

The characterization of the mixture with respect to its anti-graffiti properties was carried out as described in example 2. The surface contaminants could be completely removed in each case.

The invention claimed is:

1. A cross-linkable composition comprising
   (A) one or more organosiloxanes consisting of units of the formulae $$R_cSiO_{4-c/2} \quad (I)$$

and $$R^5(OR^4)_mSiO_{3-m/2} \quad (II),$$

where
   R are the same or different monovalent, optionally substituted hydrocarbon radicals,
   $R^4$ are the same or different and are monovalent, optionally substituted hydrocarbon radicals,
   $R^5$ is a group —$CH_2$—$NR^2R^3$,
   $R^2$ are hydrogen or monovalent, optionally substituted linear or branched hydrocarbon radicals having 1 to 6 carbon atoms,
   $R^3$ are monovalent, optionally substituted linear or branched hydrocarbon radicals having 1 to 6 carbon atoms or a cyclic saturated hydrocarbon radical having 5 or 6 carbon atoms or a phenyl radical,
   c is 1 or 2 and
   m is 0, 1 or 2,
   with the proviso that at least two $R^5$ radicals and at least four $(OR^4)$ groups are present per molecule,
   (B) silanes of the formula $$R^5Si(OR^4)_3 \quad (III)$$

and/or partial hydrolysates thereof, and component (B) is present in amounts of 5 to 20 parts by weight, based on 100 parts by weight of component (A),
   (C) organosiloxanes consisting of units of the formula $$R^6_a(R^7O)_bSiO_{(4-a-b)/2} \quad (IV),$$

where
   $R^6$ are the same or different and are monovalent, SiC-bonded hydrocarbon radicals optionally substituted by one or more halogen atoms, or an Si-bonded halogen atom,
   $R^7$ are the same or different and are monovalent, optionally substituted hydrocarbon radicals,
   a is 0 or 1 and
   b is 0, 1, 2 or 3,
   with the proviso that, in formula (IV), the sum of a+b is <4, the organosiloxane has 2 to 30 units of the formula (IV) and at least one unit is present per molecule where b is other than 0,
   and component C is present in amounts of 1 to 30 parts by weight, based on 100 parts by weight of component (A),
   (D) organosilicon compounds comprising units of the formula $$D_fSi(OR^9)_eR^8_dO_{(4-d-e-f)/2} \quad (V),$$

where
   $R^8$ are the same or different and are monovalent, optionally substituted SiC-bonded organic radicals free of nitrogen,
   $R^9$ are the same or different and are hydrogen or optionally substituted hydrocarbon radicals,
   D are the same or different and are monovalent, SiC-bonded radicals having at least one nitrogen atom that is not bonded to a carbonyl group (C=O),
   d is 0 or 1,
   e is 0, 1, 2 or 3, and
   f is 0 or 1,
   with the proviso that the sum of d+e+f is less than or equal to 4, at least one radical D is present per molecule and at least one radical D bears an $NH_2$ group per molecule, and component (D) is present in amounts of 0.1 to 2 parts by weight, based on 100 parts by weight of component (A).

2. The cross-linkable composition of claim 1, wherein siloxanes (A) comprise those of the formula $$[(R^4O)_2R^5SiO—(SiR_2O)_n—]_o(OR^4)_{2-o}R^5SiO— \\ (SiR_2O)_n—SiR^5(OR^4)_{2-o}[O—(SiR_2O)_n—SiR^5 \\ (OR^4)_2]_o \quad (VI)$$

where
o is the same or different and is 0, 1, or 2, and
n is the same or different and is an integer from 10 to 600.

3. The cross-linkable composition of claim 1, wherein at least one radical $R^5$ is an N,N-dimethylaminomethyl, N,N-diethylaminomethyl, N,N-di-n-propylaminomethyl or N,N-di-n-butylaminomethyl radical.

4. The cross-linkable composition of claim 2, wherein at least one radical $R^5$ is an N,N-dimethylaminomethyl, N,N-diethylaminomethyl, N,N-di-n-propylaminomethyl or N,N-di-n-butylaminomethyl radical.

5. The cross-linkable composition of claim 1, comprising:
   (A) organosiloxanes consisting of units of the formulae (I) and (II), with the proviso that at least two $R^5$ radicals and at least four $(OR^4)$ groups are present per molecule,
   (B) silanes of the formula (III) and/or partial hydrolysates thereof in amounts of 5 to 20 parts by weight, based on 100 parts by weight of component (A),
   (C) organosiloxanes consisting of units of the formula (IV), with the proviso that, in formula (IV), the sum of a+b is <4, the organosiloxane has 2 to 30 units of the formula (IV) and at least one unit is present per molecule where b is other than 0,
   in amounts of 1 to 30 parts by weight, based on 100 parts by weight of component (A),
   (D) organosilicon compounds comprising units of the formula (V), with the proviso that the sum of d+e+f is less than or equal to 4, at least one radical D is present per molecule and at least one radical D bears an $NH_2$ group per molecule, in amounts of 0.1 to 2 parts by weight, based on 100 parts by weight of component (A), and also at least one component (E)-(H):

(E) organic solvents,
(F) fillers,
(G) pigments and
(H) plasticizers.

6. A process for producing a cross-linkable composition of claim 1, comprising mixing the individual components in any sequence.

7. The process of claim 6, wherein firstly α,ω-dihydroxy-polydimethylsiloxanes (A0) are mixed together with silanes of the formula (III) in molar excess and are left to react with elimination of the alcohol $R^4OH$, where $R^4$ has the same definition specified above, wherein a mixture of organosiloxanes (A) and excess silanes of the formula (III) is obtained, and then any further components are added to this mixture in any desired sequence.

8. A molding, produced by cross-linking a composition of claim 1.

9. A molding produced by cross-linking a composition produced by the process of claim 6.

10. A process for treating a substrate, comprising applying a composition of claim 1 to the substrate and crosslinking the composition.

11. The process of claim 10, wherein the cross-linkable composition is used in amounts from 100 to 400 g, based on 1 $m^2$ of substrate surface area.

12. The process of claim 10, wherein the substrate is a mineral substance.

\* \* \* \* \*